Patented June 23, 1925.

1,543,287

UNITED STATES PATENT OFFICE.

HANS HAHL, OF ELBERFELD, GERMANY, ASSIGNOR TO FARBENFABRIKEN VORM. FRIEDR. BAYER AND CO., OF LEVERKUSEN, NEAR COLOGNE-ON-THE-RHINE, GERMANY.

PHARMACEUTICAL COMPOUND.

No Drawing. Application filed December 18, 1924. Serial No. 756,819.

*To all whom it may concern:*

Be it known that I, HANS HAHL, a citizen of Germany, residing at Elberfeld, in the State of Prussia, Germany, have invented new and useful Improvements in Pharmaceutical Compounds, of which the following is a specification.

The present invention relates to the manufacture and production of new products being chemically basic para alkylethers of polyvalent phenols of the benzene series. They have proved to be useful in the treatment of diseases of the heart and are oils forming whitish crystalline salts with acids, soluble in water.

One process for producing the new products consists in heating mono-alkylethers of hydroquinone with basic alkylhalides.

In order to illustrate the new process more fully, the following example is given, the parts being by weight:

3.7 parts of sodium are dissolved in 50 parts of alcohol and 20 parts of hydroquinone monomethyl ether and 25 parts of chloroethyldiethylamine are added. The reaction begins in the cold and is completed by gently heating. The mixture is poured into water and the oil which precipitates is separated, dried and distilled in vacuo.

Under a pressure of 15 mm. the diethyl amino ethyl hydroquinone monomethylether distils over as a limpid oil having the formula:

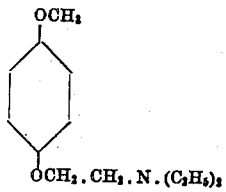

It forms crystalline salts with acids. The hydrochloride crystallizes from acetic acid ester in the shape of needles melting at 121–122° C.

I claim:—

1. As new products, dialkylethers of hydroquinone containing a basic alkyl radicle, being oils forming crystalline whitish salts with acids and being useful in the treatment of diseases of the heart.

2. The herein described new diethylaminoethyl-hydroquinone-monomethyl ether having the formula:

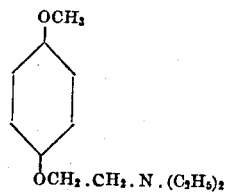

being an oil forming a white crystalline hydrochloride melting at 121–122° C.; and being useful in the treatment of heart diseases, substantially as described.

In testimony whereof I have hereunto set my hand.

HANS HAHL.